(12) United States Patent
Juhlin et al.

(10) Patent No.: US 12,411,477 B2
(45) Date of Patent: Sep. 9, 2025

(54) RETRIEVING INDUSTRIAL ASSET DATA FROM DISPARATE DATA SOURCES

(71) Applicant: ABB Schweiz AG, Baden (CH)

(72) Inventors: Prerna Juhlin, Heidelberg (DE); Somayeh Malakuti, Dossenheim (DE); Jens Doppelhamer, Ladenburg (DE); Johannes Schmitt, Ladenburg (DE)

(73) Assignee: ABB Schweiz AG, Baden (CH)

( * ) Notice: Subject to any disclaimer, the term of this patent is extended or adjusted under 35 U.S.C. 154(b) by 433 days.

(21) Appl. No.: 17/859,252

(22) Filed: Jul. 7, 2022

(65) Prior Publication Data

US 2023/0022369 A1 Jan. 26, 2023

(30) Foreign Application Priority Data

Jul. 15, 2021 (EP) .................................... 21185901

(51) Int. Cl.
*G05B 19/418* (2006.01)
(52) U.S. Cl.
CPC ... *G05B 19/41865* (2013.01); *G05B 19/4183* (2013.01); *G05B 19/4188* (2013.01)
(58) Field of Classification Search
CPC ............ G05B 19/4183; G05B 19/4188; G05B 19/4186
USPC ....................................................... 707/736
See application file for complete search history.

(56) References Cited

U.S. PATENT DOCUMENTS

| | | | |
|---|---|---|---|
| 2015/0227617 A1* | 8/2015 | Copass ................... | H04L 67/10 |
| | | | 707/756 |
| 2020/0103877 A1* | 4/2020 | Truong ............ | G05B 19/41865 |
| 2022/0163950 A1* | 5/2022 | Dipert .............. | G05B 19/41845 |

FOREIGN PATENT DOCUMENTS

| | | |
|---|---|---|
| EP | 3709227 A1 | 9/2020 |
| EP | 3809216 A1 | 4/2021 |
| WO | WO 2016/107155 A1 | 7/2016 |
| WO | WO 2019/117852 A1 | 6/2019 |

OTHER PUBLICATIONS

European Patent Office, Extended European Search Report in European Application No. 21185901.2, 8 pp. (Jan. 7, 2022).

* cited by examiner

*Primary Examiner* — Taelor Kim
(74) *Attorney, Agent, or Firm* — Leydig, Voit & Mayer, Ltd.

(57) ABSTRACT

A computer-implemented method for retrieving data that relates to at least one industrial asset includes the steps of: receiving, from a requesting entity, a query for data objects from one or more lifecycle phases of the at least one industrial asset; mapping the query to one or more types of data objects that are available from one or more given data sources relating to the at least one industrial asset; obtaining, from the one or more data sources, one or more data objects of the one or more types; producing, from the one or more data objects, a response to the query; and transmitting the response to the requesting entity.

8 Claims, 3 Drawing Sheets

RETRIEVING INDUSTRIAL ASSET DATA FROM DISPARATE DATA SOURCES

CROSS-REFERENCE TO RELATED APPLICATIONS

This patent application claims priority to European Patent Application No. 21185901.2, filed on Jul. 15, 2021, which is incorporated herein in its entirety by reference.

FIELD OF THE DISCLOSURE

The present disclosure relates to the management of data that relate to industrial assets in industrial plants and are obtainable from disparate data sources in disparate manners.

BACKGROUND OF THE INVENTION

An industrial asset's lifecycle consists of different phases such as design, commissioning and operations. In each such phase, data objects are produced by specialized software packages. Each such software package has its own data model that its respective developer has seen fit for the purpose of this software package. Typically, software packages from multiple different vendors are used during different phases of the lifecycle of one and the same asset. As a result, the data objects gathered during the lifecycle of the asset are stored in many disparate data models. For example, a design tool may use a proprietary XML data model, the commissioning parameters may be modeled in JSON format, and service data gathered during operation of the asset may be stored in an SQL database. Querying asset information requires familiarity with the respective data models and associated meanings, which the average user does not have. That is, the data objects are locked in their respective silos and cannot be put to use.

EP 3709227 A1 discloses a computer system for generating a "digital twin" of an industrial asset. This "digital twin" stores a plurality of data models and semantic relations between these data models.

BRIEF SUMMARY OF THE INVENTION

The present disclosure is directed to systems and methods for facilitating the querying of data objects that relate to at least one industrial asset and are stored according to disparate data models.

The disclosure, in one embodiment, describes a computer-implemented method for retrieving data that relates to the industrial asset. The disclosure, in another embodiment, describes a further computer-implemented method for producing a system and/service for use in that data management method.

BRIEF DESCRIPTION OF THE SEVERAL VIEWS OF THE DRAWING(S)

In the following, the invention is illustrated using Figures without any intention to limit the scope of the invention.

DETAILED DESCRIPTION OF THE INVENTION

Figure 1:
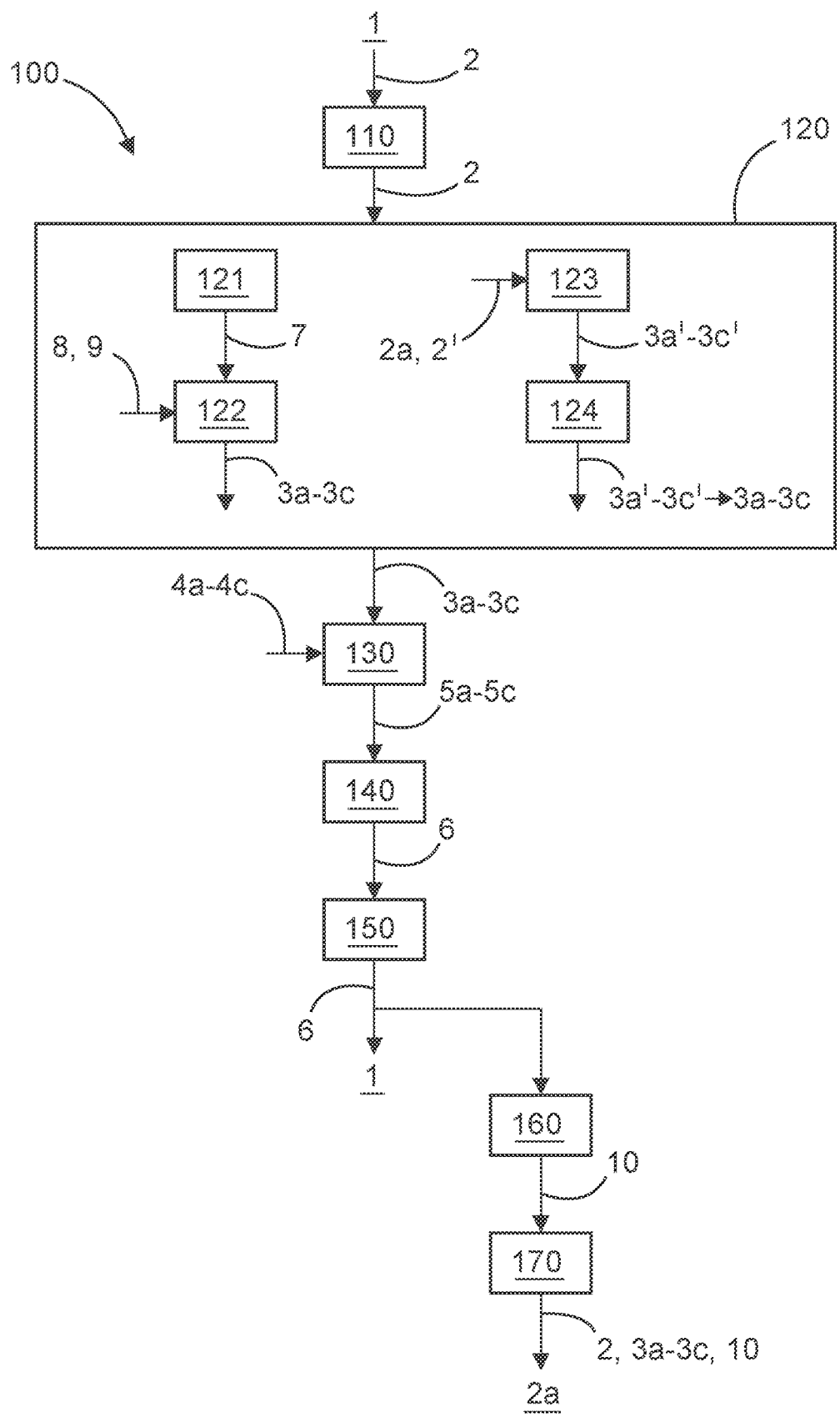
FIG. 1 illustrates a flowchart for a method for retrieving industrial asset data in accordance with the disclosure.

FIG. 1 is a schematic flow chart of an exemplary embodiment of the method 100 for retrieving data that relates to at least one industrial asset.

In step 110, a query 2 for data objects 5a-5c from one or more lifecycle phases of the at least one industrial asset is received from a requesting entity 1.

In step 120, the query 2 is mapped to one or more types 3a-3c of data objects 5a-5c that are available from one or more given data sources 4a-4c relating to the at least one industrial asset.

According to block 121, at least one term 7 that is indicative of one or more types 3a-3c of data objects 5a-5c may be extracted from the query 2. According to block 2, this at least one term 7 may be mapped to the sought types 3a-3c of data objects 5a-5c based at least in part on a given graph 8 that represents the industrial asset, and/or an industrial plant that comprises the industrial asset, and/or a given set of semantic associations 9 between terms 7 on the one hand and types 3a-3c on the other hand.

According to block 123, the query 2 may be matched to a history 2a of previous queries 2' that are stored in association with one or more types 3a'-3c' of data objects 5a-5c returned in responses 6' to those previous queries 2'. According to block 124, these one or more types 3a'-3c' may then be added to the set of types 3a-3c to which the present query 2 is mapped.

In step 130, one or more data sources of the one or more types 3a-3c are obtained from the one or more data sources 4a-4c.

In step 140, a response 6 to the query 2 is produced from the one or more data objects 5a-5c.

In step 150, the response 6 is transmitted to the requesting entity 1.

In step 160, feedback 10 is obtained from the requesting entity 1 as to how useful the response 6 is deemed by this requesting entity 1.

In step 170, the query is recorded in the history 2a in association with the types 3a-3c of data objects 5a-5c in the response 6 and with the usefulness feedback 10.

Figure 2:
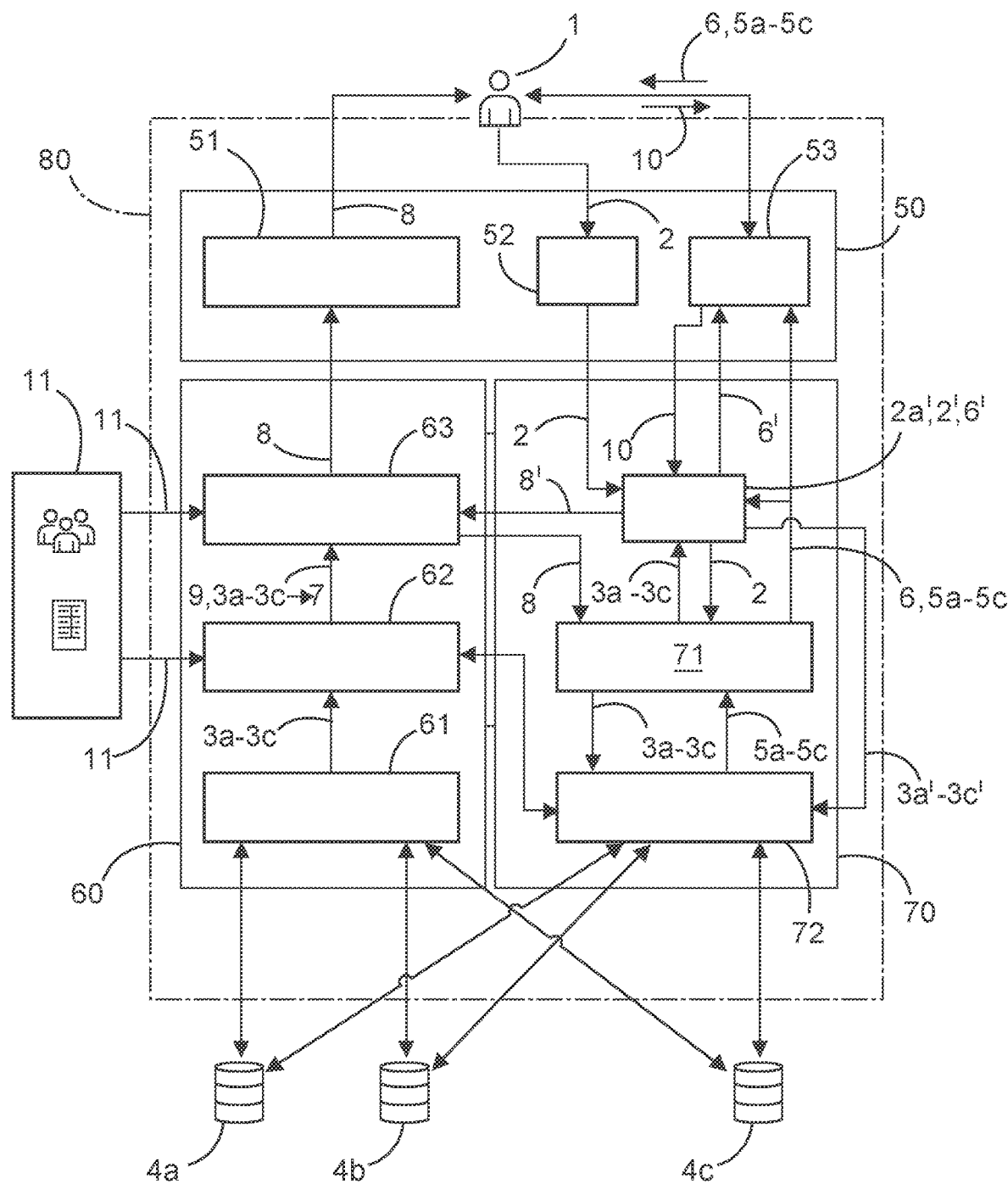
FIG. 2 is a schematic of a system for performing the method shown in FIG. 1.

FIG. 2 is a schematic block chart of an exemplary embodiment of a system 80 for use in the method 100. That is, the system 80 may be used to perform a part or all of the method 100.

In the example shown in FIG. 2, the system 80 comprises a user interface 50, a semantic enhancer 60 and a query handler 70.

The user interface 50 comprises a dynamic discovery view 51, a query input form 52, and a query response view 53.

The dynamic discovery view 51 is configured to present a graph 8 of the industrial asset, and/or of the industrial plant comprising the industrial asset, to the requesting entity 1. In particular, the dynamic discovery view 51 may show elements available for querying based on user selections combined with filtering mechanisms derived from the graph 8. The dynamic discovery view 51 may also display related elements available for querying. In particular, a user selection of a traversal path may expose all elements that can be queried together with associated semantics. A history of graphs 8 may be stored for faster processing.

The query input form 52 is configured to receive the query from the requesting entity 1. In particular, the query input form 52 may combine user-chosen terms from Dynamic Discovery View together with user-entry of asset instance identifier (e.g. serial number of powertrain) user query, e.g. "Motor Torque for Powertrain XYZ123" where "Motor Torque" and "Powertrain" are user-selected and Powertrain serial number "XYZ123" is entered by the user, into a semantic query using a suitable graph database or linked data query language, e.g. Cypher, SPARQL. The example user query may be formulated as the following semantic query using Cypher:

MATCH (d1:drive)-[:PART-OF]-(p1:powertrain)
WHERE p1.sn="XYZ123"
RETURN
    d1.CommissioningParameters.MeasuredValues.MotorTorque The query response view 53 is configured to display a response 6 to the query 2 with data objects 5a-5c, i.e., the values comprised in these data objects 5a-5c. The query response view 53 may prompt the requesting entity 1 with a usefulness rating scale to obtain usefulness feedback 10 from the requesting entity 1, which may then be passed on to the history 2a.

The semantic enricher 60 comprises APIs 61 for type information retrieval, a semantic enrichment component 62 and a graph generator 63.

The APIs 61 for type information retrieval access original data sources 4a-4c and extracts data model entity type information 3a-3c in original semantics with any related information such as entity names, identifiers, tags, descriptions, attributes, value data types, constraints, structural information, relationships with other entity types, usage etc. They may also store entity type endpoint mapping information in entity type for aiding conversion of a semantic query to an object query (using this information subsequently stored in the graph 8).

The semantic enrichment component 62 creates semantic associations by linking types 3a-3c of data objects 5a-5c to at least one term 7. It extends retrieved entity type descriptions 3a-3c with synonyms and contextual information using entity names, IDs, tags, descriptions, data model structural information, as well as additional sources. In particular, the contextual information 11 may comprise technical documentation, semantic standards, and input from domain experts. The semantic enrichment component 62 may use unsupervised learning techniques on example instances of the entity types 3a-3c from value domains, data types, units, etc. to fill missing semantics and relationships with other entity types using calls to APIs for object value retrieval.

The graph generator 63 produces the graph 8. It models entity types as vertices with associated semantic information and relationships as edges connecting different data models of same or different assets using a graph database or linked data format, e.g. MongoDB, RDF, JSON-LD. The graph generator 63 associates related entity types found via extended semantic descriptions as well as from technical documentation, domain expert knowledge. Relationships can be further described using formulae or descriptive terms if such information is provided. The graph generator 63 may use unsupervised learning techniques to fill in missing edges by: finding clusters of entities and (sub)graph types; predicting and filling in missing data in entities based on this clustering; predicting and filling in missing relations based on this clustering; and detecting inconsistencies across integrated data sources based on the clustering.

The query handler 70 comprises a query processor 71 and APIs 72 for data object 5a-5c value retrieval. It may also store the history 2a and comprise a history analyzer to evaluate this history 2a.

In the embodiment shown in FIG. 2, the query 2 received from the query input form 52 of the user interface 50 is first passed through the history 2a to check for a matching past query 2' for which a past response 6' is available. If such a past response 6' is available, it may be passed on directly to the query response view 53 of the user interface 50 to be returned to the requesting entity as new response 6. Alternatively or in combination, past types 3a'-3c' of data objects 5a-5c identified upon a previous query 2 may be re-used by the APIs 72 for data object 5a-5c value retrieval. Based on the information gathered in the history 2a, updates 8' to the graph 8 may be notified to the graph generator 63 of the semantic enricher 60.

If the query 2 has not been fully resolved by means of the past response 6', it is passed on to the query processor 71 that maps the query 2 to one or more types 3a-3c of data objects 5a-5c and passes these types 3a-3c on to the APIs 72. If needed, the query processor 71 may consult the graph 8 obtained from the graph generator 63 of the semantic enricher 60 for this mapping.

The query processor 71 may convert semantic query on the graph 8 to object queries for specific APIs 72, e.g. DataSense Query Language for Mulesoft API, optionally using mappings information stored in relevant entity types in the graph 8.

The APIs 72 request the data objects 5a-5c identified by the types 3a-3c from the data sources 4a-4c. If needed, the APIs 72 may consult the semantic enrichment component 63 of the semantic enricher 60 for The data objects 5a-5c are passed back to the query processor 71 that generates the response 6 and passes this response 6 on to the query response view 53 of the user interface 50.

Figure 3:
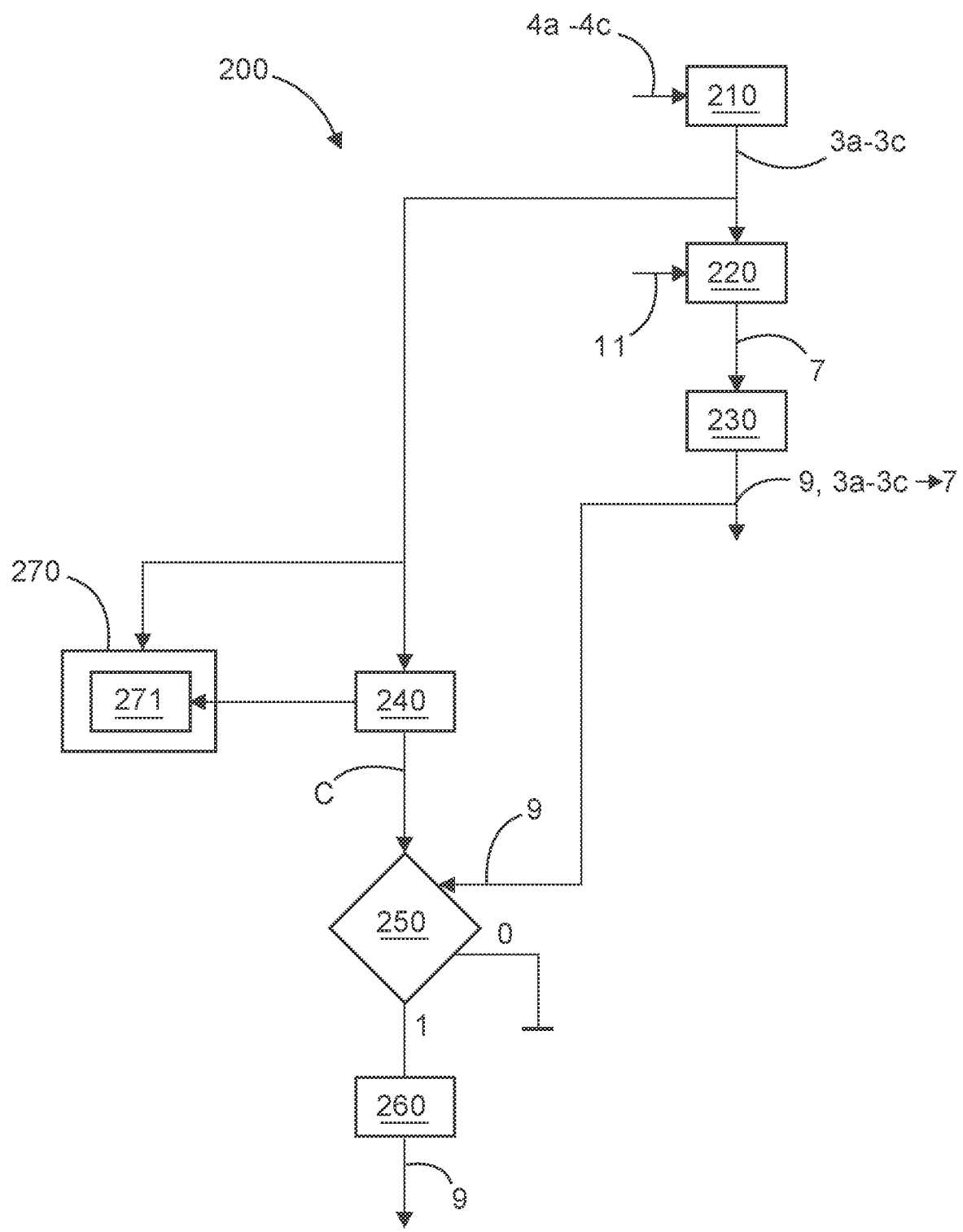
FIG. 3 illustrates an exemplary embodiment of a method for producing a system and/or service for use in the method shown in FIG. 1.

FIG. 3 is a schematic flow chart of the method 200 for producing the system 80, and/or a service for use in the method 100.

In step 210, from at least one data source 4a-4c relating to at least one industrial asset, a set of types 3a-3c of data objects 5a-5c that this data source 4a-4c provides is retrieved.

In step 220, for each type 3a-3c, based on a synonym library and/or on contextual information 11 of the industrial asset, at least one term 7 that is to serve, besides this type 3a-3c, as a handle for accessing the respective data objects 5a-5c is determined.

In step 230, a semantic association 9 between the so-obtained term 7 and the type 3a-3c is established.

In step 240, a set of types 3a-3c of data objects 5a-5c is clustered into clusters C by means of an unsupervised learning technique.

In step 270, a graph 8 that represents the industrial asset, and/or an industrial plant that comprises the industrial asset, is established. The vertices of this graph 8 correspond to types 3a-3c of data objects 5a-5c, and the edges of this graph 8 correspond to relationships between data objects 5a-5c of these types 3a-3c.

The clusters C obtained in step 240 may be used in two different manners.

In step 250, it may be checked whether a part of the types 3a-3c belonging to at least one cluster C has a semantic association 9 with at least one term 7. If this is the case (truth value 1), in step 260, a semantic association 9 may also be established between the remaining types 3a-3c belonging to this cluster C and that term 7.

According to block 271, a relationship may be established between all types 3a-3c that are members of at least one same cluster C.

The disclosure further describes a computer-implemented method for retrieving data that relates to at least one industrial asset.

In the course of this method, a query is received from a requesting entity. With this query, data objects from one or more lifecycle phases of the at least one industrial asset are sought. In particular, this lifecycle phase may comprise the design, the commissioning, and/or the operation, of the industrial asset. In particular, the design may comprise the planning how to manufacture the asset according to a given target specification. The commissioning may comprise the integration of the manufactured asset into an industrial plant such that it can perform its intended function in the plant. The operation may comprise the use of the asset in the plant according to its intended function. The query need not explicitly specify from which lifecycle phase data objects are sought. For example, a plant operator may not know whether a property of interest, such as a maximal rotation speed of a pump, is fixed as a design parameter in a control unit of the pump, or was measured during a calibration run when the pump was commissioned on-site.

The query is mapped to one or more types of data objects that are available from one or more given data sources relating to the at least one industrial asset. One or more data objects of the one or more types are then obtained from the one or more data sources. From the one or more data objects, a response to the query is produced. This response is transmitted to the requesting entity.

Data objects may, for example, comprise variables of any kind, such as numeric, string or Boolean variables, as well as aggregations of such variables into arbitrary structures. Data objects may also, for example, comprise records retrieved from a database.

By separating the mapping of the query to types of data objects from the actual obtaining of data objects of the so-determined types, a separation of duties is introduced that allows for an abstraction between the identifying of types of to-be-returned data objects on the one hand, and the intricacies of finding a suitable data source for these data objects and communicating with this source on the other hand. In particular, the logic with which the query is analyzed and broken down into types of data objects on the one hand, and the logic with which data sources are identified and the data objects are then obtained from these data sources on the other hand, may be maintained and upgraded independently.

For example, as software evolves during the lifecycle of the asset, the structure of a database in which a control software stores data objects gathered during the operation of the asset may change. For example, the control software for a pump may initially only record a single numeric value that represents the intensity of vibration of the pump, and store this value in a numeric field of the database. Later on, an upgraded version of the software may exploit the existing sensors on the pump to record a spectrum of this intensity. This spectrum is then stored in an array field in the database that associates intensity values to frequency bins. Logic that is responsible for obtaining data objects of given types from data sources may then be augmented to retrieve and return the frequency spectrum when asked for it. But this logic may also be adapted to compute, from the frequency spectrum, the previously used single vibration intensity value. In this manner, if the requesting entity continues to ask for this value, it will still be getting this value, and will not notice that, "under the hood", a whole frequency spectrum is retrieved from the database and then condensed into the single vibration intensity value. For example, the requesting entity may be a control software of a distributed control system, DCS, or any other software that is only designed to accept said single vibration intensity value and cannot handle a frequency spectrum. According to the prior art, interoperability with such software could be broken by the upgrade from a single vibration intensity value to a frequency spectrum.

In another example, the manufacturer of a first software package may acquire the manufacturer of a second software package. With the next update, the formerly disparate two software packages that stored their data objects in disparate databases may be merged into one single software package that stores data objects in one single database with a different table structure. The logic that is responsible for obtaining the data objects may then be updated accordingly to retrieve any desired data object from its new location in the new table structure.

On the other hand, no changes to this logic are necessary if the logic for analyzing the query is upgraded or expanded. This logic will still ask the lower-level logic to retrieve particular data objects of given types.

From the point of view of the requesting entity, no knowledge of the internal representation of data objects, or the data source that is competent for delivering that data object, is necessary. That is, an end user may have just a solid idea about the kind of data object that is needed and express the query using domain-specific terminology. The analysis of this query may reveal a lot of data objects that are needed, and by means of said logic for obtaining data objects, the query may fan out as a complex, federated query to a plurality of data sources. The requesting entity does not need to know about internal object naming conventions, connections between different data sources, and the correlation among their data.

In a particularly advantageous embodiment, the mapping of the query to the one or more types of data objects comprises: extracting, from the query, at least one term that is indicative of one or more types; and mapping, based at least in part on a given graph that represents the industrial asset, and/or an industrial plant that comprises the industrial asset, and/or a given set of semantic associations between terms on the one hand and types on the other hand, the at least one term to the sought types of data objects. Both the graph and the semantic associations may provide additional "handles" by which data objects of one or more given types may be found.

In an advantageous embodiment, the given graph comprises paths between all types of data objects that relate to the industrial asset, and/or the industrial plant, and are available from the one or more given data sources. In this manner, by traversing the graph, all potential candidates for types of data objects to be returned in response to the query may be enumerated and considered, even without any knowledge about where in the graph a certain type of data objects might be located. But if such knowledge is available, it may be utilized to navigate to a data type in a structured manner. For example, the graph may be presented in a "dynamic discovery view" to a user who can then learn a hierarchy which data objects relating to the industrial asset, and/or to the industrial plant, are available in the first place. In one example, for a pump as the industrial asset, the graph may have three branches that relate to the powertrain, to the impeller and to the housing, respectively; the powertrain branch may comprise sub-branches that relate to the drive, the motor and the transformer as sub-assets; for the drive as the sub-asset, available data objects may comprise design parameters (such as a rated power of a motor), commissioning parameters, and service parameters; the commissioning parameters may comprise measured values on the one hand and motor data on the other hand; the measured values may comprise actual motor speed, motor torque, a DC bus voltage at the input of an inverter that powers the motor, as well as an output voltage and output power of that inverter; and the motor data may comprise nominal speed and nominal power.

In a further advantageous embodiment, the given set of semantic associations comprises at least one pair of: a first association between a first term on the one hand and one or more types of data objects on the other hand; and a second association between a second term on the one hand and the same one or more types of data objects on the other hand, wherein the second term is a generic and/or superordinate term with respect to the first term. In this manner, data objects may be found by querying for generic and/or superordinate terms. For example, a voltage value may be associated with the term "output voltage", a current value may be associated with the term "output current", and both values may also be associated with terms such as "inverter output" and "electrical quantities."

In a further advantageous embodiment, the mapping of the query to the one or more types of data objects comprises: matching the query to a history of previous queries that are stored in association with one or more types of data objects returned in responses to those previous queries; and adding these one or more types to the set of types to which the present query is mapped.

In particular, when monitoring the normal operation of an industrial asset, the same information is needed time and time again, so that any changes may be spotted. In this case, it is not necessary to repeat the analysis of the query, which may be computationally expensive depending on its level of sophistication, time and time again. Rather, the result of the analysis may be re-used.

Alternatively or in combination to this, the previous queries may be stored in the history in association with respective previous responses. If the query matches a previous query in the history, then the respective previous response may be directly returned. Whether it is more advantageous to re-use previously identified data types or to re-use the previous response depends on the nature of the sought data. For example, if the sought data comprises information that is valid indefinitely, such as the rated power of a motor, it is more advantageous to directly return the previous response that already contains that rated power. But if the sought data comprises recent measurement results, such as a voltage, a current, a power or a torque, it is more advantageous to re-use the previously identified type of data objects and then obtain fresh data objects with measurement result from the respective data sources.

This system may preferably continue to learn from new queries during continued use. Therefore, in a further advantageous embodiment, feedback is obtained from the requesting entity as to how useful the response is deemed by this requesting entity. The query is recorded in the history in association with the types of data objects in the response and with the usefulness feedback. In particular, the re-using of types of data objects stored in association with a particular query may be made dependent on the usefulness rating meeting at least one predetermined criterion.

Alternatively or in combination to this, the query may be recorded in the history in association with the response itself. Whether it is more advantageous to record the types of data objects or to record the response itself depends on how quickly the data in the response can be expected to become outdated.

The disclosure also describes a computer-implemented method for producing a system and/or service for use in the method described above.

In the course of this method, from at least one data source relating to at least one industrial asset, a set of types of data objects that this data source provides is retrieved. For each such type, based on a synonym library and/or on contextual information of the industrial asset, at least one term is determined that is to serve, besides the type itself, as a handle for accessing the respective data objects. A semantic association between the so-obtained term and the type is established.

In this manner, the individual types of data objects are lifted to a higher abstraction level. When this abstraction level meets the abstraction level on which the query is dissected into types of data objects to query, the query can be matched to concrete types of data objects that shall be returned in response to the query.

In an advantageous embodiment, a set of types of data objects is clustered by means of an unsupervised learning technique. That is, the types of data objects are set in a working space, and by virtue of similarities and/or differences between them, at least some of the types aggregate to form one or more clusters. In response to determining that a part of the types belonging to at least one such cluster has a semantic association with at least one term, a semantic association is established also between the remaining types belonging to this cluster on the one hand and that term on the other hand. The reasoning behind this is that by virtue of types of data objects belonging to one and the same cluster, there is some similarity between these types, so the semantic associations of these types should be similar as well. Thus, by means of the unsupervised clustering, missing semantics may be filled in.

In a further advantageous embodiment, a graph is established that represents the industrial asset, and/or an industrial plant that comprises the industrial asset. The vertices of this graph correspond to types of data objects. The edges of this graph correspond to relationships between data objects of these types. In this manner, the relationships between types of data objects are transformed into a form in which they may be easily browsed by a user of the system, but also easily traversed by machine when matching the query to one or more types of data objects.

In an advantageous embodiment, a set of types of data objects is clustered by means of an unsupervised learning technique. That is, the types of data objects are set in a working space, and by virtue of similarities and/or differences between them, at least some of the types aggregate to form one or more clusters. A relationship is then established between all types that are members of at least one same cluster. By virtue of the types of data objects being members of the same cluster and thus being close together in the working space, it is thus inferred that these types are related.

For the semantic enrichment of types of data objects with further terms as "handles", additional information may be obtained from any suitable source. In a particularly advantageous embodiment, technical documentation, at least one semantic standard, and/or input from a domain expert, is chosen as a source of information for establishing semantic associations, and/or for establishing relationships between data objects of different types.

In particular, when performing one of the methods described above, the industrial asset may be chosen to comprise one or more of: a pump in a pumping plant; a field device that is in direct relationship with an industrial process executed on an industrial plant; and a process module in a modular industrial plant.

These assets are known to have particularly long service lives. That is, at a point in time during normal operation where a query is made, information recorded during design and commissioning of the asset may be years or even decades old. Data models in which data objects were recorded at that time are very likely to differ from a current data model in which data objects are recorded during normal operation. Detailed information on the past data model may even not be available at all. In this situation, it is particularly advantageous that the discovery-based semantic enrichment of types of data records facilitates matching the past data objects to the current query.

Also, it is particularly likely for these kinds of assets that the design, the commissioning and the operation are performed by different entities. This makes it more likely that the software tools used for gathering data objects during these different lifecycle phases, and thus the data structures used for storing these data objects, are disparate.

Because the methods are computer-implemented, they may be wholly or partially embodied in software. The invention therefore also provides one or more computer programs with machine readable instructions that, when executed on one or more computers and/or compute instances, cause the one or more computers to perform one of the methods described above. In particular, a virtualization platform and one or more hardware controllers may be regarded as computers.

The disclosure also describes one or more non-transitory storage media and/or download products with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

LIST OF REFERENCE SIGNS 1 requesting entity
2 query from requesting entity
2' past query 2
2a history, comprises past queries 2' and responses 6'
3a-3c types of data objects 5a-5c
3a'-3c' past types 3a-3c
4a-4c data sources
5a-5c data objects
6 response to query
6' response to past query 6
7 term that serves as handle for type 3a-3c
8 graph of industrial asset and/or industrial plant
8' update to graph 8
9 semantic association
10 usefulness feedback
11 contextual information
50 user interface of system 80
51 dynamic discovery view of user interface 50
52 query input form of user interface 50
53 query response view of user interface 5
60 semantic enricher of system 80
61 APIs for type information retrieval in enricher 60
62 semantic enrichment component in enricher 60
63 graph generator in enricher 60
70 query handler of system 80
71 query processor of query handler 70
72 APIs for data object 5a-5c value retrieval in query handler 70
100 method for retrieving industrial asset data
110 receiving query 2 from requesting entity 1
120 mapping query 2 to types 3a-3c of data objects 5a-5c
121 extracting term 7 from query 2
122 mapping term 7 to type 3a-3c with graph 8, associations 9
123 matching query 2 to history 2a of past queries 2'
124 adding past types 3a'-3c' to current to-be-retrieved types 3a-3c
130 obtaining data objects 5a-5c of types 3a-3c from data sources 4a-4c
140 producing response 6 from data objects 5a-5c
150 transmitting response 6 to requesting entity 1
160 obtaining feedback from requesting entity 1
170 recording query 2 in history 2a
200 method for producing system 80 and/or service
210 retrieving types 3a-3c of data objects 5a-5c
220 determining term 7 as handle for types 3a-3c
230 establishing semantic association between term 7 and types 3a-3c
240 clustering types 3a-3c by unsupervised learning
250 checking for semantic association 9
260 extending semantic association 9 with term 7 to cluster C
270 establishing graph 8
271 establishing relationship between types 3a-3c in cluster C
C cluster of types 3a-3c All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for retrieving data that relates to at least one industrial asset, comprising the steps of:

retrieving, from at least one data source relating to the at least one industrial asset, a set of types of data objects that the at least one data source provides;

for each type, determining, based on a synonym library and/or on contextual information of the industrial asset, at least one term that is to serve, besides this type, as a handle for accessing the respective data objects;

establishing a semantic association between the determined at least one term and the type from the set of types of data objects;

establishing a graph that represents the industrial asset, and/or an industrial plant that comprises the industrial asset, wherein vertices of the graph correspond to the set of types of data objects, and edges of the graph correspond to relationships between the data objects and the set of types of data objects:

generating, by a semantic enrichment component, semantic associations by linking the set of types of data objects to the at least one term by implementing, by the semantic enrichment component, an unsupervised learning technique on example instances of entity types to fill missing semantics and relationships with other entity types by invoking application programming interface (API) calls for object value retrieval;

clustering the set of types of data objects by means of the unsupervised learning technique:

in response to determining that a part of the types belonging to at least one cluster has a semantic association with at least one term, establishing a semantic association also between the remaining types of the set of types of data objects belonging to this cluster and at least one term, wherein a graph generator fills in missing edges of the graph using the unsupervised learning technique and the clusters of the set of types of data objects;

receiving, from a requesting entity, a query for the data objects from one or more lifecycle phases of the at least one industrial asset;

mapping, by a first software logic, the query to the set of types of data objects that are available from one or more given data sources relating to the at least one industrial asset, wherein each type of the set of types of data objects corresponds to a different value, range, spectrum, or structure;

obtaining, by a second software logic, from the one or more data sources, one or more data objects of the set of types of data objects;

producing, by the second software logic, from the one or more data objects, a response to the query; and transmitting the response to the requesting entity.

2. The method of claim 1, wherein the mapping of the query to the types of data objects comprises:

extracting, from the query, at least one term that is indicative of one or more sought types; and mapping, based at least in part on the graph that represents the industrial asset, and/or an industrial plant that comprises the industrial asset, and/or a given set of semantic associations between terms and types, the at least one term to the sought types of data objects.

3. The method of claim 2, wherein the graph comprises paths between all types of data objects that relate to the industrial asset, and/or the industrial plant, and are available from the one or more given data sources.

4. The method of claim 1, wherein the mapping of the query to the types of data objects comprises:

matching the query to a history of previous queries that are stored in association with the types of data objects returned in responses to those previous queries; and adding these one or more types to the set of types to which the present query is mapped.

5. The method of claim 4, further comprising:

obtaining feedback from the requesting entity as to how useful the response is deemed by this requesting entity; and recording the query in the history in association with the types of data objects in the response and with the usefulness feedback.

6. The method of claim 1, wherein the given set of semantic associations comprises at least one pair of:

a first association between a first term and the types of data objects; and a second association between a second term and the same types of data objects;

wherein the second term is a generic and/or superordinate term with respect to the first term.

7. The method of claim 1, wherein the industrial asset comprises one or more of:

a pump in a pumping plant;

a field device that is in direct relationship with an industrial process executed on an industrial plant; and a process module in a modular industrial plant.

8. The method of claim 1, wherein technical documentation, at least one semantic standard, and/or input from a domain expert, is chosen as a source of information for establishing semantic associations, and/or for establishing relationships between data objects of different types.

* * * * *